(12) United States Patent
Zhang et al.

(10) Patent No.: US 9,496,998 B2
(45) Date of Patent: Nov. 15, 2016

(54) METHOD, APPARATUS AND SYSTEM FOR UPLINK DATA TRANSMISSION

(71) Applicant: Huawei Technologies Co., Ltd., Shenzhen (CN)

(72) Inventors: Jinfang Zhang, Shenzhen (CN); Bojie Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/553,800

(22) Filed: Nov. 25, 2014

(65) Prior Publication Data

US 2015/0078321 A1    Mar. 19, 2015

Related U.S. Application Data

(63) Continuation of application No. PCT/CN2012/084071, filed on Nov. 5, 2012.

(30) Foreign Application Priority Data

May 25, 2012   (CN) .......................... 2012 1 0166503

(51) Int. Cl.
*H04W 4/00* (2009.01)
*H04L 5/00* (2006.01)
(Continued)

(52) U.S. Cl.
CPC ............ *H04L 5/0035* (2013.01); *H04L 69/04* (2013.01); *H04W 88/085* (2013.01); *H04B 7/024* (2013.01); *H04L 61/2069* (2013.01); *H04W 28/06* (2013.01)

(58) Field of Classification Search
None
See application file for complete search history.

(56) References Cited

U.S. PATENT DOCUMENTS 9,066,252 B2 *  6/2015  Liu .................... H04W 28/0289
                                                          370/328
9,203,933 B1 *  12/2015 Akhter ................. H04W 28/06
                                                          370/328
(Continued)

FOREIGN PATENT DOCUMENTS

CN        101873715 A     10/2010
CN        102075467 A      5/2011
(Continued)

OTHER PUBLICATIONS

"CoMP Clarification of Definitions and TP," 3GPP TSG RAN WG1 Meeting #55, Prague, Czech Republic, R1-084351, $3^{rd}$ Generation Partnership Project, Valbonne, France (Nov. 10-14, 2008).
(Continued)

*Primary Examiner* — Anh-Vu Ly
(74) *Attorney, Agent, or Firm* — Leydig, Voit & Mayer, Ltd.

(57) ABSTRACT

The embodiments of the present invention provide a method, apparatus, and system. The method comprises: sending, by a centralized processing node, control information containing address information of a service ERRU and the transmission mode of ERRUs to the ERRUs in a COMP set; receiving the compressed uplink COMP frequency domain data sent by the service ERRU according to the transmission mode, wherein the compressed uplink COMP frequency domain data are data obtained by the service ERRU by compressing the original uplink COMP frequency domain data sent by the non-service ERRUs and the original uplink COMP frequency domain data of the service ERRU, and receiving the original uplink COMP frequency domain data sent by at least one ERRU according to the transmission mode. In the present invention, the data are compressed to reduce the uplink transmission flow between the ERRUs in the COMP set and the centralized processing node.

15 Claims, 9 Drawing Sheets

(51) Int. Cl.
*H04W 88/08* (2009.01)
*H04L 29/06* (2006.01)
*H04W 28/06* (2009.01)
*H04B 7/02* (2006.01)
*H04L 29/12* (2006.01)

(56) References Cited

U.S. PATENT DOCUMENTS

| | | | |
|---|---|---|---|
| 9,215,296 B1* | 12/2015 | Akhter | H04L 69/04 370/328 |
| 2013/0017852 A1* | 1/2013 | Liu | H04W 88/085 455/509 |
| 2013/0088979 A1* | 4/2013 | Bi | H04B 7/024 370/252 |
| 2013/0100907 A1* | 4/2013 | Liu | H04L 5/0023 370/329 |

FOREIGN PATENT DOCUMENTS

| | | |
|---|---|---|
| CN | 102082622 A | 6/2011 |
| CN | 102255692 A | 11/2011 |
| CN | 102291398 A | 12/2011 |
| EP | 2264966 A1 | 12/2010 |

OTHER PUBLICATIONS

Wang et al., "Application of BBU+RRU Based CoMP System to LTE-Advanced," IEEE International Conference on Communications Workshops, pp. 1-5, Institute of Electrical and Electronics Engineers, New York, New York (Jun. 14-18, 2009).

* cited by examiner

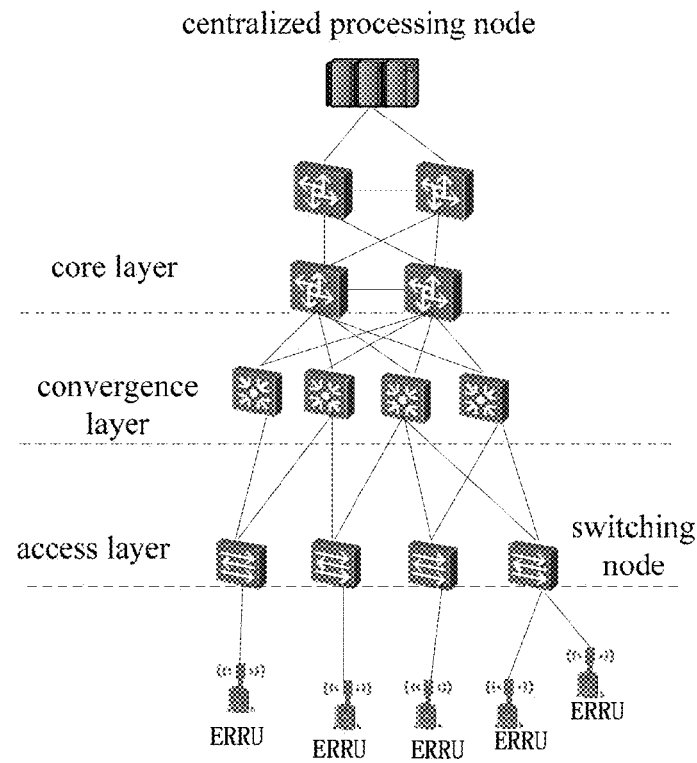

Fig. 1C a centralized processing node sends control information to ERRUs in a COMP set, wherein the control information includes address information of a service ERRU in the COMP set and the transmission mode of ERRUs in the COMP set, and the other ERRUs excluding the service ERRU in the COMP set are non-service ERRUs — 201 the centralized processing node receives the compressed uplink COMP frequency domain data sent by the service ERRU in the COMP set according to the transmission mode, and receives the original uplink COMP frequency domain data sent by at least one ERRU in the COMP set according to the transmission mode — 202

Fig. 2

METHOD, APPARATUS AND SYSTEM FOR UPLINK DATA TRANSMISSION

CROSS-REFERENCE TO RELATED APPLICATIONS

This application is a continuation of International Patent Application No. PCT/CN2012/084071, filed on Nov. 5, 2012, which claims priority to Chinese Patent Application No. 201210166503.7, filed on May 25, 2012, both of which are hereby incorporated by reference in their entireties.

FIELD OF THE INVENTION

The present invention relates to communication technologies, and more particularly, to a method, apparatus and system for uplink data transmission.

BACKGROUND OF THE INVENTION

In an LTE-A (Long Term Evolution-Advanced) radio access network based on cloud computing, BBUs (Base Band Unit) of a plurality of base stations are concentrated together to form a BBU resource pool, the BBU resource pool is interconnected with RRUs (Remote Radio Unit) through a CPRI (Common Public Radio Interface) and the like, data of the RRUs are transmitted to the BBU resource pool in a long distance, to support large-scale joint processing in a system. If a data transmission rate on the CPRI is higher, then the correspondingly necessary system bandwidth will increase linearly, and in order to reduce the demand for transmission bandwidth during accessing to a transmission network, in the prior art, a base band signal is compressed in such manners as reducing sampling rate, nonlinear quantization, IQ data compression, subcarrier compression, etc.

In the prior art, a multi-antenna compression manner is adopted during RRU uplink data transmission to improve the bandwidth utilization rate. Each RRU compresses original data and then transmits the same to the BBU, so as to reduce the transmission data flow between the RRU and the BBU, and after receiving the compressed data, the BBU decompresses them to recover the original data. However, the inventor, in a research process of the prior art, found that when a COMP (Coordinated Multipoint Transmission and Reception) technology is introduced into the LTE-A system, user data may be jointly received by a plurality of RRUs in a COMP set, to improve the throughput of cell edge users, at this time, the data of one user may be received by a plurality of RRUs, although the plurality of RRUs receive related data of the same user, yet since each RRU does not have complete user data, it is difficult for a single RRU to compress the user data to obtain a compression gain, and when each RRU directly transmits the received non-compressed user data to the BBU, the uplink data transmission flow in the network will be increased.

SUMMARY OF THE INVENTION

The embodiments of the present invention provide a method, apparatus and system for uplink data transmission, in order to solve the problem in the prior art that it is difficult for a single RRU in a COMP set to compress user data to obtain a compression gain.

To solve the above-mentioned technical problem, the embodiments of the present invention disclose the following technical solutions:

A method for uplink data transmission, comprising: sending, by a centralized processing node, control information to ERRUs (Evolved Remote Radio Unit) in a coordinated multipoint transmission and reception COMP set, wherein the control information includes address information of a service evolved remote radio unit ERRU in the COMP set and the transmission mode of ERRUs in the COMP set, and the other ERRUs excluding the service ERRU in the COMP set are non-service ERRUs; receiving compressed uplink COMP frequency domain data sent by the service ERRU in the COMP set according to the transmission mode, wherein the compressed uplink COMP frequency domain data are data obtained by the service ERRU by compressing original uplink COMP frequency domain data sent by a non-service ERRU in the COMP set and the original uplink COMP frequency domain data of the service ERRU, and receiving the original uplink COMP frequency domain data sent by at least one ERRU in the COMP set according to the transmission mode.

A method for uplink data transmission, comprising: receiving, by an ERRU, control information sent by a centralized processing node, wherein the ERRU is an ERRU in the COMP set, the control information includes address information of the service ERRU in the COMP set and the transmission mode of ERRUs in the COMP set, and the other ERRUs excluding the service ERRU in the COMP set are non-service ERRUs;

when the ERRU is a service ERRU, compressing the original uplink COMP frequency domain data sent by the non-service ERRU in the COMP set and the original uplink COMP frequency domain data of the service ERRU to generate compressed uplink COMP frequency domain data, and transmitting the compressed uplink COMP frequency domain data to the centralized processing node according to the transmission mode; when the ERRU is a non-service ERRU, transmitting the original uplink COMP frequency domain data of the non-service ERRU to the service ERRU according to the transmission mode in accordance with the address information of the service ERRU.

An apparatus for uplink data transmission, arranged in a centralized processing node, comprising:

a sending unit, configured to send control information to ERRUs in a COMP set, wherein the control information includes address information of a service ERRU in the COMP set and the transmission mode of ERRUs in the COMP set, and the other ERRUs excluding the service ERRU in the COMP set are non-service ERRUs;

a first receiving unit, configured to receive compressed uplink COMP frequency domain data sent by the service ERRU in the COMP set according to the transmission mode, wherein the compressed uplink COMP frequency domain data are data obtained by the service ERRU by compressing original uplink COMP frequency domain data sent by the non-service ERRUs in the COMP set and the original uplink COMP frequency domain data of the service ERRU; and a second receiving unit, configured to receive the original uplink COMP frequency domain data sent by at least one ERRU in the COMP set according to the transmission mode.

An apparatus for uplink data transmission, arranged in an ERRU, comprising: a receiving unit, configured to receive control information sent by a centralized processing node, wherein the ERRU is an ERRU in the COMP set, the control information includes address information of a service ERRU in the COMP set and the transmission mode of ERRUs in the COMP set, and the other ERRUs excluding the service ERRU in the COMP set are non-service ERRUs;

a first transmitting unit configured to, when the ERRU is a service ERRU, compress the original uplink COMP frequency domain data sent by the non-service ERRUs in the COMP set and the original uplink COMP frequency domain data of the service ERRU to generate compressed uplink COMP frequency domain data, and transmit the compressed uplink COMP frequency domain data to the centralized processing node according to the transmission mode; and a second transmitting unit configured to, when the ERRU is a non-service ERRU, transmit the original uplink COMP frequency domain data of the non-service ERRUs to the service ERRU according to the transmission mode in accordance with the address information of the service ERRU.

A system for uplink data transmission, comprising: a centralized processing node and ERRUs belonging to a COMP set, the centralized processing node is configured to send control information to ERRUs in the COMP set, wherein the control information includes address information of a service ERRU in the COMP set and the transmission mode of ERRUs in the COMP set, and the other ERRUs excluding the service ERRU in the COMP set are non-service ERRUs;

the ERRU is configured to, when the ERRU is a service ERRU, compress the original uplink COMP frequency domain data sent by the non-service ERRUs in the COMP set and the original uplink COMP frequency domain data of the service ERRU to generate compressed uplink COMP frequency domain data, and transmit the compressed uplink COMP frequency domain data to the centralized processing node according to the transmission mode; when the ERRU is a non-service ERRU, transmit the original uplink COMP frequency domain data of the non-service ERRU to the service ERRU in the COMP set according to the transmission mode in accordance with the address information of the service ERRU; and the centralized processing node is further configured to receive the original uplink COMP frequency domain data sent by at least one ERRU in the COMP set according to the transmission mode.

In the embodiments of the present invention, the centralized processing node sends the control information containing the address information of the service ERRU and the transmission mode to the ERRUs in the COMP set, when the ERRU is the service ERRU, the original uplink COMP frequency domain data sent by the non-service ERRU in the COMP set and the original uplink COMP frequency domain data of the service ERRU are compressed to generate compressed uplink COMP frequency domain data, and the compressed uplink COMP frequency domain data are transmitted to the centralized processing node according to the transmission mode, when the ERRU is a non-service ERRU, the original uplink COMP frequency domain data sent by the non-service ERRU are transmitted to the service ERRU in the COMP set according to the transmission mode in accordance with the address information of the service ERRU, the centralized processing node receives the original uplink COMP frequency domain data sent by at least one ERRU in the COMP set according to the transmission mode, and the number of at least one ERRU is smaller than the sum of all ERRUs in the COMP set. In the embodiments of the present invention, the service ERRU in the COMP set is determined, for enabling the non-service ERRUs to transmit the original uplink COMP frequency domain data to the service ERRU for uniform compression and send the compressed original uplink COMP frequency domain data to the centralized processing node, meanwhile, at least one ERRU in the COMP set may transmit the original COMP frequency domain data to the centralized processing node, for enabling the centralized processing node to recover the original uplink COMP frequency domain data of all ERRUs in the COMP set according to the compressed uplink COMP frequency domain data and the original COMP frequency domain data; therefore, by adopting the embodiment of the present invention, when a plurality of ERRUs in the COMP set jointly receive data, the data may be compressed to obtain a compression gain, in order to reduce the uplink transmission flow between the ERRUs in the COMP set and the centralized processing node.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, based on the accompanying drawings, other accompanying drawings may be obtained by those of ordinary skill in the art without any creative effort.

FIG. 1C is a schematic diagram of a structure of tree network interconnection of a centralized processing node and an ERRU of the present invention;

FIG. 2 is a flowchart of a first embodiment of an uplink data transmission method of the present invention;

DETAILED DESCRIPTION OF THE EMBODIMENTS

The following embodiments of the present invention provide a method, apparatus and system for uplink data transmission.

For better understanding of those skilled in the art to technical solutions in the embodiments of the present invention, and for more obvious and understandable purposes, features and advantages of the embodiments of the present invention, a further detailed illustration to the technical solutions in the embodiments of the present invention will be given below in combination with the accompanying drawings.

Figure 1A:
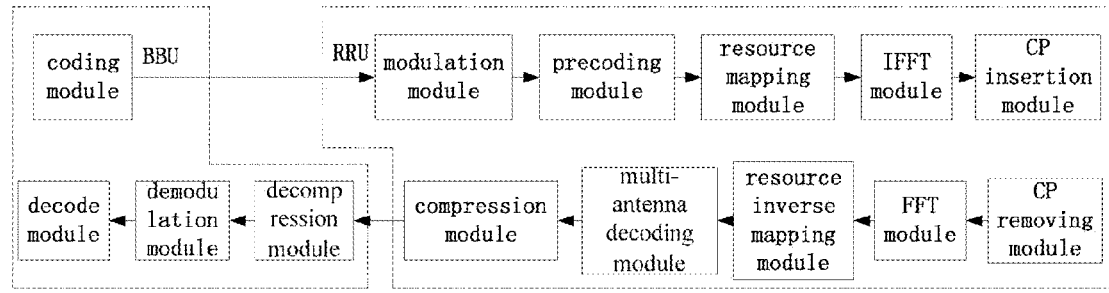
FIG. 1A is a schematic diagram of a transmission structure of a BBU module and an RRU module in an embodiment of the present invention.

In the embodiments of the present invention, in order to reduce the data transmission flow between a BBU and an RRU, some original functional modules in the BBU may be transferred into the RRU, for example, a downlink modulation module, a precoding module, a resource mapping module, an IFFT module, a CP insertion module or the like; further, when a multi-antenna compression mode is adopted, a multi-antenna decoding module and a decoded compression module are further added in the RRU, and meanwhile, a corresponding decompression module is added in the BBU. As shown in FIG. 1A, it is a schematic diagram of a transmission structure of a BBU module and an RRU module in an embodiment of the present invention.

Figure 1B:
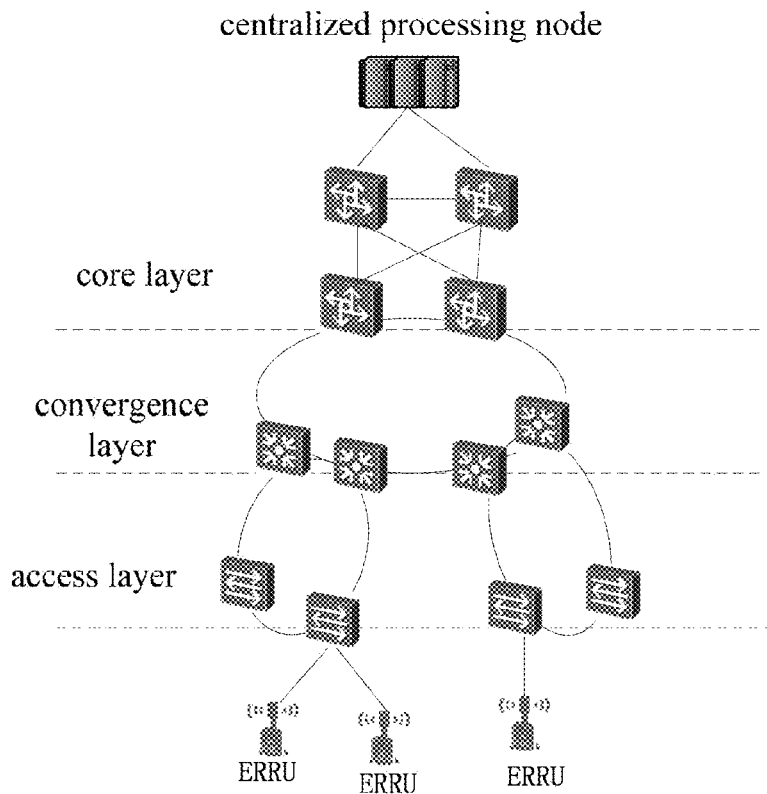
FIG. 1B is a schematic diagram of a structure of annular network interconnection of a centralized processing node and an ERRU of the present invention.

In the embodiments of the present invention, a BBU resource pool is defined as a centralized processing node, and since a part of the original functional modules in the BBU is added in the RRU, it may be defined as ERRU (Evolved RRU). The centralized processing node and the ERRU may be interconnected through such switched networks as Ethernet and IP network or the like. FIG. 1B is a schematic diagram of a structure of annular network interconnection of a centralized processing node and an ERRU. FIG. 1C is a schematic diagram of a structure of tree network interconnection of a centralized processing node and an ERRU. It may be seen from FIG. 1B and FIG. 1C that, the ERRU is connected to convergence layer and core layer transmission networks through a switching node of an access layer, and is connected to the centralized processing node finally. The switching node in the access layer may be a two-layer or three-layer switch.

In combination with the network structure shown in FIG. 1B and FIG. 1C, when the COMP technology is introduced into the LTE-A system, a plurality of ERRUs may form a COMP set, for jointly receiving user data, so that the embodiments of the present invention describe the process of compressing original uplink COMP frequency domain data of the ERRUs and uploading the same to the centralized processing node through a determined service ERRU in the COMP set.

FIG. 2 is a flowchart of a first embodiment of an uplink data transmission method of the present invention, and the embodiment describes the uplink data transmission process from the centralized processing node side:

step 201: a centralized processing node sends control information to ERRUs in a COMP set, wherein the control information includes address information of a service ERRU in the COMP set and the transmission mode of ERRUs in the COMP set, and the other ERRUs excluding the service ERRU in the COMP set are non-service ERRUs.

In the embodiment, the ERRUs in the COMP set are divided into service ERRUs and non-service ERRUs according to different execution functions thereof (namely, different roles), wherein the service ERRUs may be selected by the centralized processing node according to network information or state information of the ERRUs in the COMP set, and the number of the service ERRU may be at least one.

When sending the control information, the centralized processing node contains the address information of the service ERRU in the control information, the control information may be transmitted in a broadcasting manner, for enabling each ERRU in the COMP set to receive the control information and find a corresponding service ERRU in the COMP set according to the address information of the service ERRU contained in the control information. In this case, when only the address information of one service ERRU is contained, the service ERRU is the service ERRU of all non-service ERRUs; and when the address information of two or more service ERRUs is contained, the non-service ERRU corresponding to the address information of each service ERRU may also be contained in the control information, for enabling each non-service ERRU to acquire the address information of its corresponding service ERRU according to the control information.

Besides the address information of the service ERRU, the control information further includes the transmission modes of the ERRUs in the COMP set, according to different ERRU types, namely, for the service ERRUs and the non-service ERRUs, the transmission modes may be different, as long as it is ensured that in accordance with the indication of the transmission modes, at least one copy of compressed uplink COMP frequency domain data and at least one copy of original uplink COMP frequency domain data may be transmitted to the centralized processing node, for enabling the centralized processing node to recover the original uplink COMP frequency domain data of all ERRUs according to the compressed uplink COMP frequency domain data and the original uplink COMP frequency domain data.

Specifically, the transmission modes of the ERRUs contained in the control information may include: transmitting, by at least one ERRU in the COMP set, the original uplink COMP frequency domain data to the centralized processing node, transmitting, by the non-service ERRUs, the original uplink COMP frequency domain data to the service ERRU, and transmitting, by the service ERRU, the compressed uplink COMP frequency domain data to the centralized processing node.

The transmitting, by at least one ERRU, the original uplink COMP frequency domain data to the centralized processing node, may include: transmitting, by at least one non-service ERRU, the original uplink COMP frequency domain data to the centralized processing node, or transmitting, by at least one service ERRU, the original uplink COMP frequency domain data to the centralized processing node; or transmitting, by at least one non-service ERRU and at least one service ERRU, the original uplink COMP frequency domain data to the centralized processing node, wherein the original uplink COMP frequency domain data transmitted by at least one service ERRU to the centralized processing node may be original uplink COMP data of the service ERRU, and/or original uplink COMP frequency domain data sent by the non-service ERRU and received by the service ERRU.

Step 202: the centralized processing node receives the compressed uplink COMP frequency domain data sent by the service ERRU in the COMP set according to the transmission mode, and receives the original uplink COMP frequency domain data sent by at least one ERRU in the COMP set according to the transmission mode.

In this case, the compressed uplink COMP frequency domain data are data obtained by the service ERRU by compressing the original uplink COMP frequency domain data sent by the non-service ERRUs in the COMP set and the original uplink COMP frequency domain data of the service ERRU. Since the ERRUs in the COMP set have the original uplink COMP frequency domain data from the same user, these original uplink frequency domain data have correlation, the data are transmitted after being compressed to reduce the uplink transmission flow, and the compressed uplink COMP frequency domain data may be one or more copies of data.

In this case, to recover the original uplink COMP frequency domain data of all ERRUs, the centralized processing node further needs to receive the original uplink COMP frequency domain data sent by at least one ERRU, so as to recover the original uplink COMP frequency domain data of all ERRUs according to the compressed uplink COMP frequency domain data and the original uplink COMP frequency domain data. The number of at least one ERRU sending the original uplink COMP frequency domain data in the COMP set is smaller than the sum of all ERRUs in the COMP set, in order to ensure that compared with the existing manner that all ERRUs directly transmit the original uplink COMP frequency domain data to a BUU, the network transmission flow may be reduced.

It may be seen from the above-mentioned embodiment that, in the embodiment, the service ERRU in the COMP set is determined, for enabling the non-service ERRUs to transmit the original uplink COMP frequency domain data to the service ERRU for uniform compression and send the compressed original uplink COMP frequency domain data to the centralized processing node, meanwhile, at least one ERRU in the COMP set may transmit the original COMP frequency domain data to the centralized processing node, for enabling the centralized processing node to recover the original uplink COMP frequency domain data of all ERRUs in the COMP set according to the compressed uplink COMP frequency domain data and the original COMP frequency domain data. Therefore, by adopting the embodiment of the present invention, when a plurality of ERRUs in the COMP set jointly receive data, the data may be compressed to obtain a compression gain, in order to reduce the uplink transmission flow between the ERRUs in the COMP set and the centralized processing node.

Figure 3:
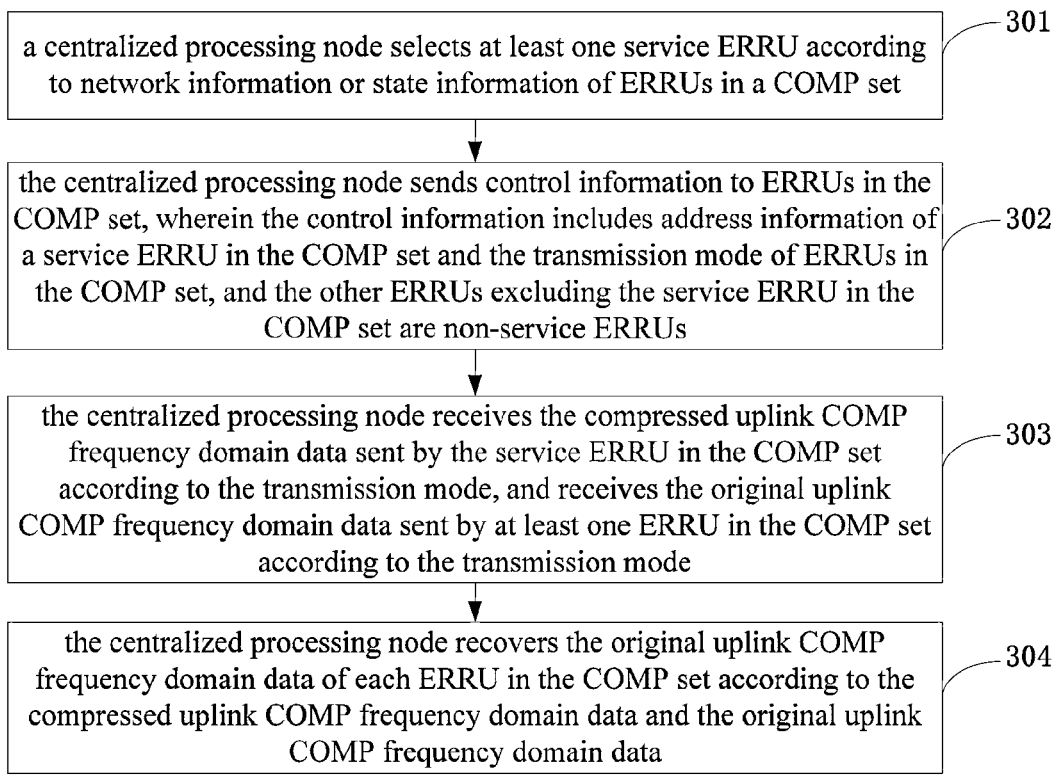
FIG. 3 is a flowchart of a second embodiment of an uplink data transmission method of the present invention.

FIG. 3 is a flowchart of a second embodiment of an uplink data transmission method of the present invention, and the embodiment describes the detail process of uplink data transmission from the centralized processing node side:

step 301: a centralized processing node selects at least one service ERRU according to network information or state information of ERRUs in a COMP set.

In this case, the network information mainly refers to network capacity and transmission load in a network, namely, the centralized processing node may select the service ERRU according to the uplink transmission flow and network capacity of an access layer network, a convergence layer network or a core layer network where the ERRU is located. Since all ERRUs need to transmit uplink COMP frequency domain data in the access layer network, namely, the non-service ERRU needs to upload original uplink COMP frequency domain data, and the service ERRU needs to upload compressed uplink COMP frequency domain data or simultaneously upload the original uplink COMP frequency domain data and the compressed uplink COMP frequency domain data, thus when the compressed uplink data size is smaller than the original uplink data size, one of the ERRUs uploads the original uplink COMP frequency domain data, and the service ERRU only needs to upload the compressed uplink COMP frequency domain data to alleviate the transmission pressure of the access layer network where the service ERRU is located, for example, if the uplink capacity of a certain ERRU is limited, or the uplink flow within a period of time is very large, the centralized processing node may estimate the data size of the compressed uplink COMP frequency domain data obtained by the ERRU by compressing the original uplink COMP frequency domain data according to scheduling information, if the data size of the compressed uplink COMP frequency domain data is smaller than the data size of the original uplink COMP frequency domain data, the ERRU may be selected as the service ERRU, and the service ERRU is merely used for transmitting the compressed uplink COMP frequency domain data; when the service ERRU simultaneously transmits the original uplink COMP frequency domain data and the compressed uplink COMP frequency domain data, since the non-service ERRU does not need to transmit the original uplink COMP frequency domain data to the centralized processing node, it will not generate uplink transmission flow on both of the convergence layer network and the core layer network, so that when the uplink transmission flow of the convergence layer network or core layer network where one ERRU is located is limited, or the uplink transmission flow within a period of time is quite large, the ERRU may be selected as the non-service ERRU, meanwhile, the service ERRU is configured to transmit the compressed uplink COMP frequency domain data and the original uplink COMP frequency domain data to the centralized processing node.

In this case, the state information of the ERRU in the COMP set mainly refers to processing load and capacity information of the ERRU. When performing uplink scheduling, the centralized processing node may select the service ERRU according to the processing load and the processing capacity of the ERRU, for compressing the original uplink COMP frequency domain data. For example, three cells are provided with access service through ERRU1, ERRU 2 and ERRU 3 respectively, it is assumed that most users in the cells where the ERRU1 and the ERRU 2 are located adopt MIMO (Multiple-Input Multiple-Out-put) transmission, and few users in the cell where the ERRU3 is located are at an activated state, and the computing power of the ERRU3 is relatively strong, so that the ERRU3 may be selected to serve as the service ERRU.

Step 302: the centralized processing node sends control information to ERRUs in the COMP set, wherein the control information includes address information of a service ERRU in the COMP set and the transmission mode of ERRUs in the COMP set, and the other ERRUs excluding the service ERRU in the COMP set are non-service ERRUs.

In the embodiment, the ERRUs in the COMP set are divided into service ERRUs and non-service ERRUs according to different execution functions thereof (namely, different roles), wherein the service ERRUs may be selected by the centralized processing node according to network information or state information of the ERRUs in the COMP set, and the number of the service ERRU is at least one.

When sending the control information, the centralized processing node contains the address information of the service ERRU in the control information, the control information may be transmitted in a broadcasting manner, for enabling each ERRU in the COMP set to receive the control information and find a corresponding service ERRU in the COMP set according to the address information of the service ERRU contained in the control information. In this case, when only the address information of one service ERRU is contained, the service ERRU is the service ERRU of all non-service ERRUs; and when the address information of two or more service ERRUs are contained, the non-service ERRU corresponding to the address information of each service ERRU may also be contained in the control information, for enabling each non-service ERRU to acquire the address information of its corresponding service ERRU according to the control information.

Besides the address information of the service ERRU, the control information further includes the transmission modes of the ERRUs in the COMP set, according to different ERRU types, namely, for the service ERRUs and the non-service ERRUs, the transmission modes may be different, as long as it is ensured that in accordance with the indication of the transmission modes, at least one copy of compressed uplink COMP frequency domain data and at least one copy of original uplink COMP frequency domain data may be transmitted to the centralized processing node, for enabling the centralized processing node to recover the original uplink COMP frequency domain data of all ERRUs according to the compressed uplink COMP frequency domain data and the original uplink COMP frequency domain data.

Specifically, the transmission modes of the ERRUs contained in the control information may include: transmitting, by at least one ERRU in the COMP set, the original uplink COMP frequency domain data to the centralized processing node, transmitting, by the non-service ERRU, the original uplink COMP frequency domain data to the service ERRU, and transmitting, by the service ERRU, the compressed uplink COMP frequency domain data to the centralized processing node.

The transmitting, by at least one ERRU, the original uplink COMP frequency domain data to the centralized processing node, may include: transmitting, by at least one non-service ERRU, the original uplink COMP frequency domain data to the centralized processing node, or transmitting, by at least one service ERRU, the original uplink COMP frequency domain data to the centralized processing node; or transmitting, by at least one non-service ERRU and at least one service ERRU, the original uplink COMP frequency domain data to the centralized processing node. In this case, the original uplink COMP frequency domain data transmitted by at least one service ERRU to the centralized processing node may be original uplink COMP data of the service ERRU, and/or original uplink COMP frequency domain data sent by the non-service ERRU and received by the service ERRU.

In this case, at least one non-service ERRU in the COMP set may transmit the original uplink COMP frequency domain data to the service ERRU and the centralized processing node in a multicast manner or unicast manner, the other non-service ERRUs excluding the at least one non-service ERRU may transmit the original uplink COMP frequency domain data to the service ERRU in the unicast manner, and the service ERRU may transmit the compressed uplink COMP frequency domain data to the centralized processing node in the unicast manner; or the non-service ERRUs in the COMP set may transmit the original uplink COMP frequency domain data to the service ERRU in the unicast manner, the service ERRU may transmit the compressed uplink COMP frequency domain data to the centralized processing node in the unicast manner, and at least one service ERRU may transmit the original uplink COMP frequency domain data of at least one ERRU to the centralized processing node in the unicast manner.

Step 303: the centralized processing node receives the compressed uplink COMP frequency domain data sent by the service ERRU in the COMP set according to the transmission mode, and receives the original uplink COMP frequency domain data sent by at least one ERRU in the COMP set according to the transmission mode.

In this case, the compressed uplink COMP frequency domain data are data obtained by the service ERRU by compressing the original uplink COMP frequency domain data sent by the non-service ERRUs in the COMP set and the original uplink COMP frequency domain data of the service ERRU. Since the ERRUs in the COMP set have the original uplink COMP frequency domain data from the same user, these original uplink COMP frequency domain data have correlation, the data are transmitted after being compressed to reduce the uplink transmission flow, and the compressed uplink COMP frequency domain data may be one or more copies of data.

In this case, to recover the original uplink COMP frequency domain data of all ERRUs, the centralized processing node further needs to receive the original uplink COMP frequency domain data sent by at least one ERRU, so as to recover the original uplink COMP frequency domain data of all ERRUs according to the compressed uplink COMP frequency domain data and the original COMP frequency domain data. The number of at least one ERRU sending the original uplink COMP frequency domain data in the COMP set is smaller than the sum of all ERRUs in the COMP set, in order to ensure that compared with the existing manner that all ERRUs directly transmit the original uplink COMP frequency domain data to a BUU, the network transmission flow may be reduced.

Step 304: the centralized processing node recovers the original uplink COMP frequency domain data of each ERRU in the COMP set according to the compressed uplink COMP frequency domain data and the original uplink COMP frequency domain data.

It may be seen from the above-mentioned embodiment that, in the embodiment, the service ERRU in the COMP set is determined, for enabling the non-service ERRUs to transmit the original uplink COMP frequency domain data to the service ERRU for uniform compression and send the compressed original uplink COMP frequency domain data to the centralized processing node, meanwhile, at least one ERRU in the COMP set may transmit the original COMP frequency domain data to the centralized processing node, for enabling the centralized processing node to recover the original uplink COMP frequency domain data of all ERRUs in the COMP set according to the compressed uplink COMP frequency domain data and the original COMP frequency domain data. Therefore, by adopting the embodiment of the present invention, when a plurality of ERRUs in the COMP set jointly receive data, the data may be compressed to obtain a compression gain, in order to reduce the uplink transmission flow between the ERRUs in the COMP set and the centralized processing node.

Figure 4:
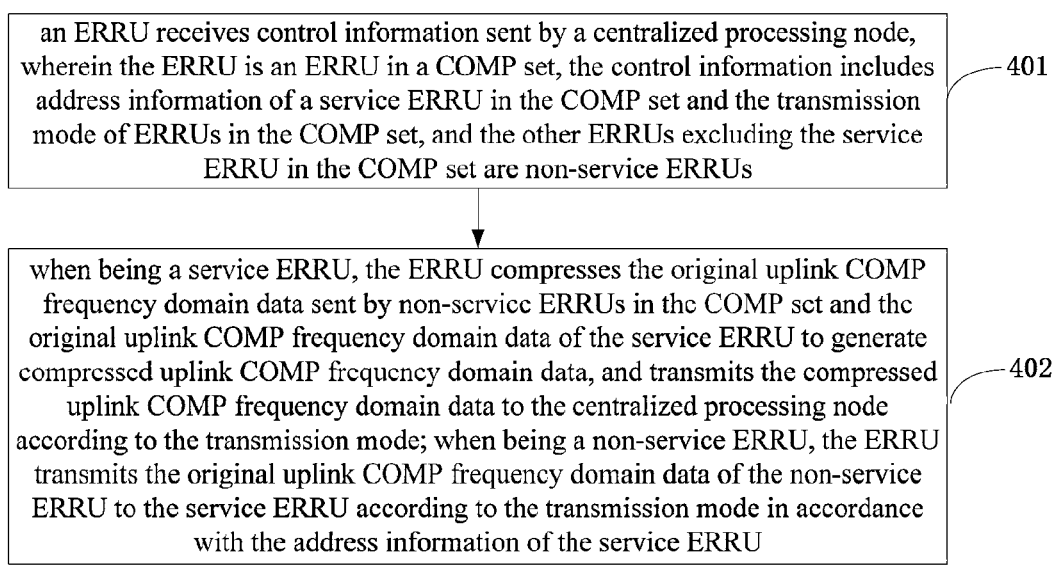
FIG. 4 is a flowchart of a third embodiment of an uplink data transmission method of the present invention.

FIG. 4 is a flowchart of a third embodiment of an uplink data transmission method of the present invention, and the embodiment describes the uplink data transmission process from the ERRU side.

Step 401: an ERRU receives control information sent by a centralized processing node, wherein the ERRU is an ERRU in a COMP set, the control information includes address information of a service ERRU in the COMP set and the transmission mode of ERRUs in the COMP set, and the other ERRUs excluding the service ERRU in the COMP set are non-service ERRUs.

In the embodiment, the ERRUs in the COMP set are divided into service ERRUs and non-service ERRUs according to different execution functions thereof (namely, different roles), wherein the service ERRUs may be selected by the centralized processing node according to network information or state information of the ERRUs in the COMP set, and the number of the service ERRU is at least one.

When sending the control information, the centralized processing node contains the address information of the service ERRU in the control information, the control information may be transmitted in a broadcasting manner, for enabling each ERRU in the COMP set to receive the control information and find a corresponding service ERRU in the COMP set according to the address information of the service ERRU contained in the control information. In this case, when only the address information of one service ERRU is contained, the service ERRU is the service ERRU of all non-service ERRUs; and when the address information of two or more service ERRUs are contained, the non-service ERRU corresponding to the address information of each service ERRU may also be contained in the control information, for enabling each non-service ERRU to acquire the address information of its corresponding service ERRU according to the control information.

Besides the address information of the service ERRU, the control information further includes the transmission modes of the ERRUs in the COMP set, according to different ERRU types, namely, for the service ERRUs and the non-service ERRUs, the transmission modes may be different, as long as it is ensured that in accordance with the indication of the transmission modes, at least one copy of compressed uplink COMP frequency domain data and at least one copy of original uplink COMP frequency domain data may be transmitted to the centralized processing node, for enabling the centralized processing node to recover the original uplink COMP frequency domain data of all ERRUs according to the compressed uplink COMP frequency domain data and the original uplink COMP frequency domain data.

Step 402: when being a service ERRU, the ERRU compresses the original uplink COMP frequency domain data sent by non-service ERRUs in the COMP set and the original uplink COMP frequency domain data of the service ERRU to generate compressed uplink COMP frequency domain data, and transmits the compressed uplink COMP frequency domain data to the centralized processing node according to the transmission mode; when being a non-service ERRU, the ERRU transmits the original uplink COMP frequency domain data of the non-service ERRU to the service ERRU according to the transmission mode in accordance with the address information of the service ERRU.

Specifically, when the ERRU is a service ERRU, the service ERRU may transmit the compressed uplink COMP frequency domain data to the centralized processing node according to a unicast mode; when the ERRU is a non-service ERRU, the original uplink COMP frequency domain data of the non-service ERRU may be transmitted to the service ERRU in the COMP set according to a unicast mode or a multicast mode in accordance with the address information of the service ERRU.

Further, when the ERRU is a non-service ERRU, the original uplink COMP frequency domain data of the non-service ERRU may be transmitted to the centralized processing node according to the transmission mode; specifically, the original uplink COMP frequency domain data of the non-service ERRU may be transmitted to the centralized processing node according to the unicast mode or multicast mode. When the ERRU is a service ERRU, at least one of the original uplink COMP frequency domain data, in the original uplink COMP frequency domain data transmitted to the service ERRUR by at least one non-service ERRU in the COMP set and the original uplink COMP frequency domain data of the service ERRU, may be transmitted to the centralized processing node according to the transmission mode, and the transmission mode may be specifically the unicast mode.

In the embodiment of the present invention, when the service ERRU compresses the original uplink COMP frequency domain data, various existing compression methods may be adopted, for example, differential signal compression is directly implemented on the frequency domain data; or sending signal estimation with strong correlation is obtained by channel estimation measurement and multi-antenna decoding, and then the original uplink COMP frequency domain data are compressed in a differential manner; or the similarity between data received by a plurality of antennas is restored through the user channel information obtained in the latest measurement, and lossless compression is implemented on multi-antenna signals through a streaming compression algorithm; or the service ERRU directly demodulates and decodes uplink COMP data and uploads the same. It should be noted that the antenna compression method in the embodiment of the present invention is not limited to several methods listed above.

It may be seen from the above-mentioned embodiment that, in the embodiment, the service ERRU in the COMP set is determined, for enabling the non-service ERRUs to transmit the original uplink COMP frequency domain data to the service ERRU for uniform compression and send the compressed original uplink COMP frequency domain data to the centralized processing node, meanwhile, at least one ERRU in the COMP set may transmit the original COMP frequency domain data to the centralized processing node, for enabling the centralized processing node to recover the original uplink COMP frequency domain data of all ERRUs in the COMP set according to the compressed uplink COMP frequency domain data and the original COMP frequency domain data. Therefore, by adopting the embodiment of the present invention, when a plurality of ERRUs in the COMP set jointly receive data, the data may be compressed to obtain a compression gain, in order to reduce the uplink transmission flow between the ERRUs in the COMP set and the centralized processing node.

Figure 5:
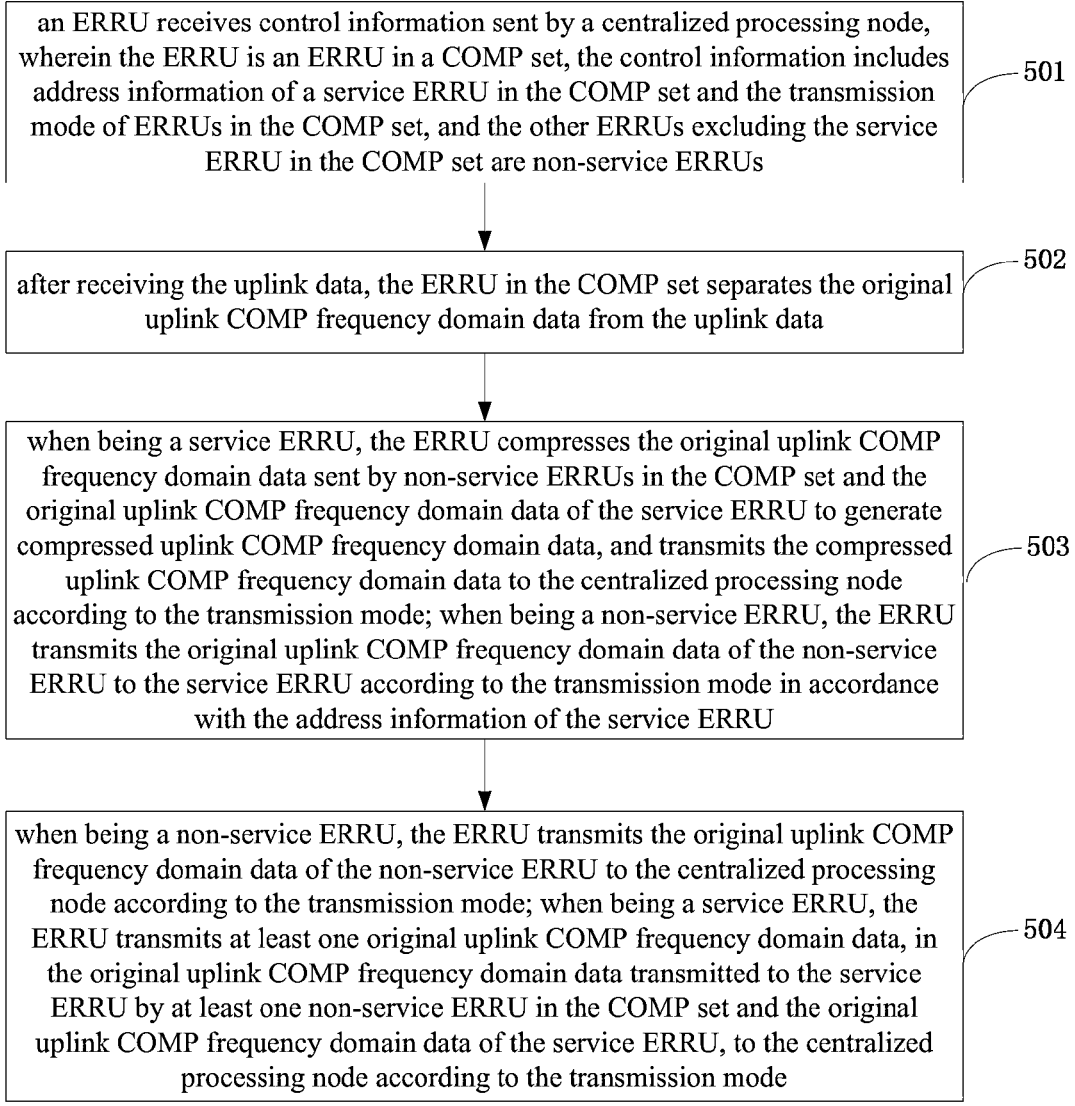
FIG. 5 is a flowchart of a fourth embodiment of an uplink data transmission method of the present invention.

FIG. 5 is a flowchart of a fourth embodiment of an uplink data transmission method of the present invention, and the embodiment describes the detailed process of uplink data transmission from the ERRU side:

step 501: an ERRU receives control information sent by a centralized processing node, wherein the ERRU is an ERRU in a COMP set, the control information includes address information of a service ERRU in the COMP set and the transmission mode of ERRUs in the COMP set, and the other ERRUs excluding the service ERRU in the COMP set are non-service ERRUs.

In the embodiment, the ERRUs in the COMP set are divided into service ERRUs and non-service ERRUs according to different execution functions thereof (namely, different roles), wherein the service ERRUs may be selected by the centralized processing node according to network information or state information of the ERRUs in the COMP set, and the number of the service ERRU is at least one.

When sending the control information, the centralized processing node contains the address information of the service ERRU in the control information, the control information may be transmitted in a broadcasting manner, for enabling each ERRU in the COMP set to receive the control information and find a corresponding service ERRU in the COMP set according to the address information of the service ERRU contained in the control information. In this case, when only the address information of one service ERRU is contained, the service ERRU is the service ERRU of all non-service ERRUs; and when the address information of two or more service ERRUs are contained, the non-service ERRU corresponding to the address information of each service ERRU may also be contained in the control information, for enabling each non-service ERRU to acquire the address information of its corresponding service ERRU according to the control information.

Besides the address information of the service ERRU, the control information further includes the transmission modes of the ERRUs in the COMP set, according to different ERRU types, namely, for the service ERRUs and the non-service ERRUs, the transmission modes may be different, as long as it is ensured that in accordance with the indication of the transmission modes, at least one copy of compressed uplink COMP frequency domain data and at least one copy of original uplink COMP frequency domain data may be transmitted to the centralized processing node, for enabling the centralized processing node to recover the original uplink COMP frequency domain data of all ERRUs according to the compressed uplink COMP frequency domain data and the original uplink COMP frequency domain data.

Step 502: after receiving the uplink data, the ERRU in the COMP set separates the original uplink COMP frequency domain data from the uplink data.

After receiving the uplink data, the ERRU in the COMP set may separate the original uplink frequency domain data from the uplink data according to the time-frequency resource information contained in the control information, besides the original uplink COMP frequency domain data required to be used in the embodiment, the original uplink frequency domain data may further contain a part of original uplink non-COMP frequency domain data, the part of original uplink non-COMP frequency domain data may be directly transmitted by the ERRU or transmitted after being compressed, and will not be repeated redundantly herein.

Step 503: when being a service ERRU, the ERRU compresses the original uplink COMP frequency domain data sent by non-service ERRUs in the COMP set and the original uplink COMP frequency domain data of the service ERRU to generate compressed uplink COMP frequency domain data, and transmits the compressed uplink COMP frequency domain data to the centralized processing node according to the transmission mode; when being a non-service ERRU, the ERRU transmits the original uplink COMP frequency domain data of the non-service ERRU to the service ERRU according to the transmission mode in accordance with the address information of the service ERRU.

Specifically, when the ERRU is the service ERRU, the service ERRU may transmit the compressed uplink COMP frequency domain data to the centralized processing node according to a unicast mode; when the ERRU is the non-service ERRU, the original uplink COMP frequency domain data of the non-service ERRU may be transmitted to the service ERRU in the COMP set according to a unicast mode or a multicast mode in accordance with the address information of the service ERRU.

In the embodiment of the present invention, when the service ERRU compresses the original uplink COMP frequency domain data, various existing compression methods may be adopted, for example, differential signal compression is directly implemented on the frequency domain data; or sending signal estimation with strong correlation is obtained by channel estimation measurement and multi-antenna decoding, and then the original uplink COMP frequency domain data are compressed in a differential manner; or the similarity between data received by a plurality of antennas is restored through the user channel information obtained in the latest measurement, and lossless compression is implemented on multi-antenna signals through a streaming compression algorithm; or the service ERRU directly demodulates and decodes uplink COMP data and uploads the same. It should be noted that the antenna compression method in the embodiment of the present invention is not limited to several methods listed above.

Step 504: when being a non-service ERRU, the ERRU transmits the original uplink COMP frequency domain data of the non-service ERRU to the centralized processing node according to the transmission mode; when being a service ERRU, the ERRU transmits at least one original uplink COMP frequency domain data, in the original uplink COMP frequency domain data transmitted to the service ERRU by at least one non-service ERRU in the COMP set and the original uplink COMP frequency domain data of the service ERRU, to the centralized processing node according to the transmission mode.

Specifically, the non-service ERRU may transmit the original uplink COMP frequency domain data to the centralized processing node according to the unicast mode or multicast mode. The service ERRU may transmit at least one of the original uplink COMP frequency domain data, in the original uplink COMP frequency domain data transmitted to the service ERRU by at least one non-service ERRU in the COMP set and the original uplink COMP frequency domain data of the service ERRU, to the centralized processing node according to the unicast mode.

It may be seen from the above-mentioned embodiment that, in the embodiment, the service ERRU in the COMP set is determined, for enabling the non-service ERRUs to transmit the original uplink COMP frequency domain data to the service ERRU for uniform compression and send the compressed original uplink COMP frequency domain data to the centralized processing node, meanwhile, at least one ERRU in the COMP set may transmit the original COMP frequency domain data to the centralized processing node, for enabling the centralized processing node to recover the original uplink COMP frequency domain data of all ERRUs in the COMP set according to the compressed uplink COMP frequency domain data and the original COMP frequency domain data. Therefore, by adopting the embodiment of the present invention, when a plurality of ERRUs in the COMP set jointly receive data, the data may be compressed to obtain a compression gain, in order to reduce the uplink transmission flow between the ERRUs in the COMP set and the centralized processing node.

It is taken as an example that the COMP set contains three ERRUs to describe the uplink data transmission process in the embodiment of the present invention, in combination with a specific network structure.

Figure 6A:
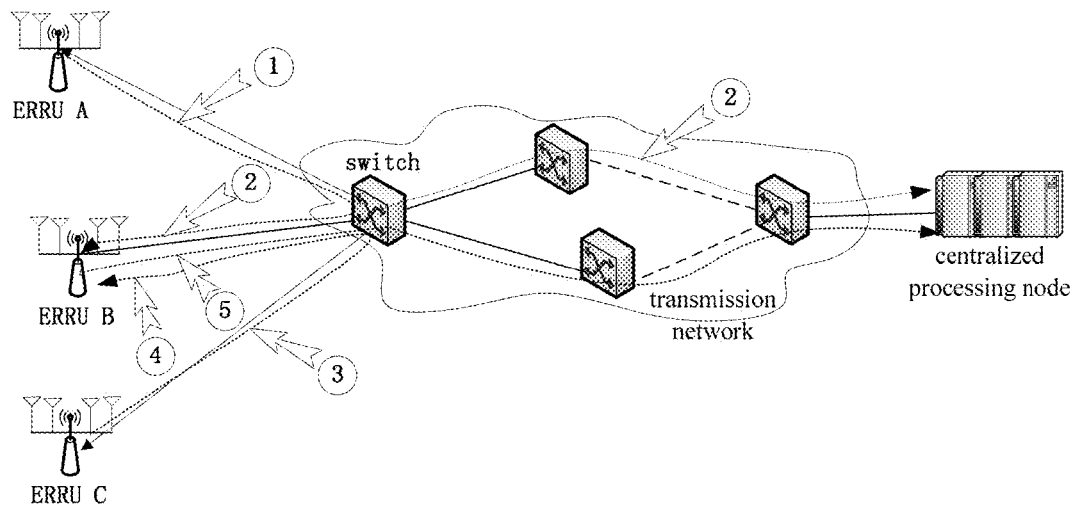
FIG. 6A is a schematic diagram of a first uplink data transmission process utilizing an embodiment of the present invention under a COMP network structure.

FIG. 6A is a schematic diagram of a first uplink data transmission process utilizing an embodiment of the present invention under a COMP network structure, in the uplink data transmission process, only one service ERRU is set, the service ERRU transmits at least one copy of compressed uplink COMP frequency domain data, one non-service ERRU transmits the original uplink COMP frequency domain data, and the rest non-service ERRUs only transmit the original uplink COMP frequency domain data to the service ERRU; in FIG. 6A, the COMP set includes ERRU A, ERRU B and ERRU C, the above-mentioned ERRUs interact information through a transmission network and the centralized processing node. In this case, it is assumed that the ERRU A and the ERRU C are non-service ERRUs, and the ERRU B is a service ERRU.

The centralized processing node sends control information to all ERRUs in the COMP set, wherein the control information includes the address information of the set service ERRU B and the uplink transmission modes of the ERRUs, it is assumed that the specific information of the uplink transmission mode in FIG. 6A includes: one non-service ERRU needs to upload the original uplink COMP frequency domain data to the service ERRU and the centralized processing node, the service ERRU needs to transmit the compressed uplink COMP frequency domain data to the centralized processing node, and the other non-service ERRUs excluding the foregoing non-service ERRU transmit the original uplink COMP frequency domain data to the service ERRU.

It is assumed that, in FIG. 6A, the non-service ERRU A learns that one copy of original uplink COMP frequency domain data needs to be uploaded according to the transmission mode, then the non-service ERRU A will separate original uplink COMP frequency domain data A from the received uplink data, and simultaneously transmits the original uplink COMP frequency domain data A to the centralized processing node and the service ERRU B in a multicast mode, according to the multicast address allocated by the centralized processing node in the transmission mode (indicated by arrows ①,② in FIG. 6A);

the non-service ERRU C may transmit original uplink COMP frequency domain data C separated from the received uplink data to the service ERRU B in the unicast mode (indicated by arrows ③,④ in FIG. 6A);

the service ERRU B separates original uplink frequency domain data B from its received uplink data, since the non-service ERRU has transmitted the original uplink COMP frequency domain data A to the centralized processing node, when compressing the original uplink COMP frequency domain data A, the original uplink COMP frequency domain data B and the original uplink COMP frequency domain data C, the service ERRU B may compress the original uplink COMP frequency domain data A and the original uplink COMP frequency domain data B, and compress the original uplink COMP frequency domain data A and the original uplink COMP frequency domain data C, so as to obtain two copies of compressed uplink COMP frequency domain data, and the two copies of compressed uplink COMP frequency domain data may be transmitted to the centralized processing node in the unicast mode (indicated by arrow ⑤ in FIG. 6A);

the centralized processing node implements decompression according to original uplink COMP frequency domain data A and two copies of compressed uplink COMP frequency domain data to obtain three copies of original frequency domain data, namely, original uplink COMP frequency domain data A, original uplink COMP frequency domain data B and original uplink COMP frequency domain data C.

In the above-mentioned FIG. 6A, since the service ERRU B only needs to transmit the compressed uplink COMP frequency domain data, the uplink transmission flow of access layer, convergence layer and core layer transmission networks where the service ERRU B is located may be reduced; moreover, since the non-service ERRU C only needs to transmit the original uplink COMP frequency domain data to the service ERRU B without uploading the same to the centralized processing node, the uplink transmission flow of the access layer, convergence layer and core layer transmission networks where the service ERRU C is located may also be reduced.

Figure 6B:
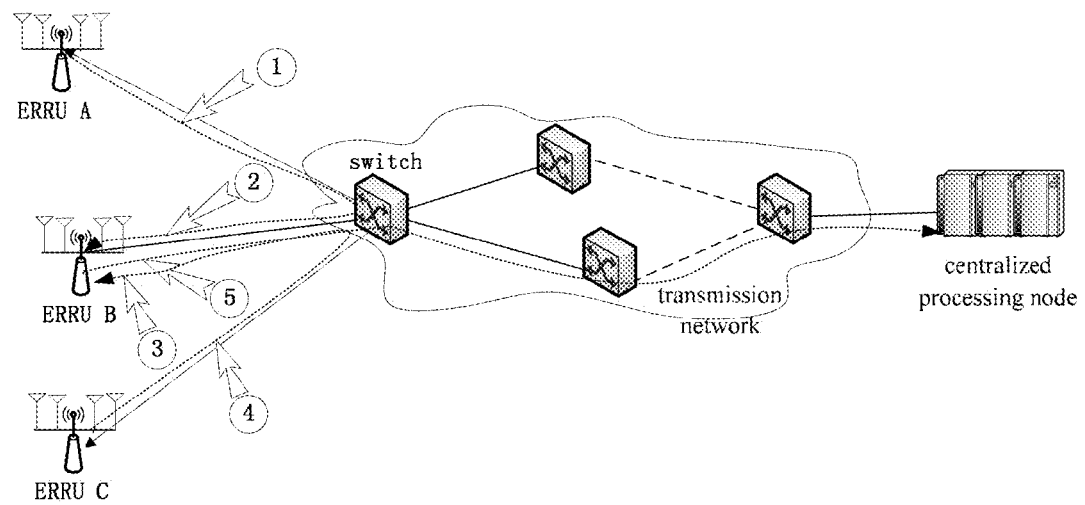
FIG. 6B is a schematic diagram of a second uplink data transmission process utilizing an embodiment of the present invention under a COMP network structure.

FIG. 6B is a schematic diagram of a second uplink data transmission process utilizing an embodiment of the present invention under a COMP network structure, in the uplink data transmission process, only one service ERRU is set, and the service ERRU transmits at least one copy of compressed uplink COMP frequency domain data and at least one copy of original uplink COMP frequency domain data:

in FIG. 6B, the COMP set includes ERRU A, ERRU B and ERRU C, the above-mentioned ERRUs interact information through a transmission network and the centralized processing node. In this case, it is still assumed that the ERRU A and the ERRU C are non-service ERRUs, and the ERRU B is a service ERRU.

The centralized processing node sends control information to all ERRUs in the COMP set, wherein the control information includes the address information of the set service ERRU and the uplink transmission modes of the ERRUs, it is assumed that the specific information of the uplink transmission mode in FIG. 6B includes: one service ERRU needs to upload the original uplink COMP frequency domain data and the compressed uplink COMP frequency domain data, and the non-service ERRUs need to transmit the original uplink COMP frequency domain data to the service ERRU.

It is assumed that, in FIG. 6B, the non-service ERRU A may transmit the original uplink COMP frequency domain data A separated from the received uplink data to the service ERRU B in a unicast mode (indicated by arrows ①,② in FIG. 6B);

the non-service ERRU C may transmit original uplink COMP frequency domain data C separated from the received uplink data to the service ERRU B in the unicast mode (indicated by arrows ③,④ in FIG. 6B);

the service ERRU B separates original uplink frequency domain data B from its received uplink data, the service ERRU B may select any copy of original uplink COMP frequency domain data from the original uplink COMP frequency domain data A and the original uplink COMP frequency domain data C, and it is assumed that the original uplink COMP frequency domain data A are selected; thus, when compressing the original uplink COMP frequency domain data A, the original uplink COMP frequency domain data B and the original uplink COMP frequency domain data C, the service ERRU B may compress the original uplink COMP frequency domain data A and the original uplink COMP frequency domain data B, and compress the original uplink COMP frequency domain data A and the original uplink COMP frequency domain data C, so as to obtain two copies of compressed uplink COMP frequency domain data, and the above selected original uplink COMP frequency domain data A and the two copies of compressed uplink COMP frequency domain data may be transmitted to the centralized processing node in the unicast mode (indicated by arrow ⑤ in FIG. 6B);

the centralized processing node implements decompression according to original uplink COMP frequency domain data A and two copies of compressed uplink COMP frequency domain data to obtain three copies of original frequency domain data, namely, original uplink COMP frequency domain data A, original uplink COMP frequency domain data B and original uplink COMP frequency domain data C.

In the above-mentioned FIG. 6B, since the non-service ERRU A and the non-service ERRU C only need to transmit the original uplink COMP frequency domain data to the service ERRU B without uploading the same to the centralized processing node, the uplink transmission flow of access layer, convergence layer and core layer transmission networks where the non-service ERRU is located may be reduced.

Figure 6C:
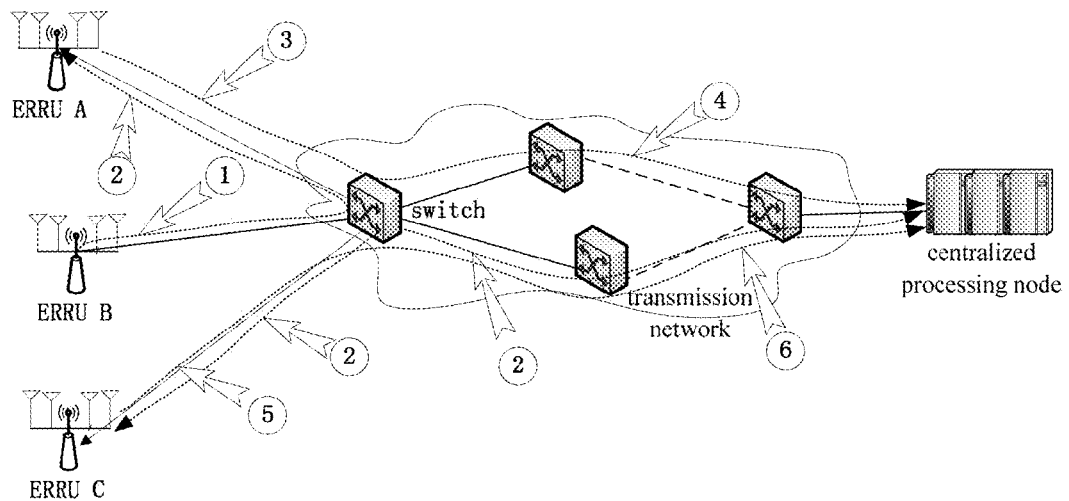
FIG. 6C is a schematic diagram of a third uplink data transmission process utilizing an embodiment of the present invention under a COMP network structure.

FIG. 6C is a schematic diagram of a third uplink data transmission process utilizing an embodiment of the present invention under a COMP network structure, in the uplink data transmission process, two service ERRUs are set, the service ERRUs transmit the compressed uplink COMP frequency domain data, and one non-service ERRU transmits the original uplink COMP frequency domain data:

in FIG. 6C, the COMP set includes ERRU A, ERRU B and ERRU C, the above-mentioned ERRUs interact information through a transmission network and the centralized processing node. In this case, it is assumed that the ERRU A and the ERRU C are service ERRUs, and the ERRU B is a non-service ERRU.

The centralized processing node sends control information to all ERRUs in the COMP set, wherein the control information includes the address information of the set service ERRU and the uplink transmission modes of the ERRUs, it is assumed that the specific information of the uplink transmission mode in FIG. 6C includes: one non-service ERRU needs to upload the original uplink COMP frequency domain data to the service ERRU and the centralized processing node, the service ERRU needs to transmit the compressed uplink COMP frequency domain data, and the other non-service ERRUs excluding the foregoing non-service ERRU transmit the original uplink COMP frequency domain data to the service ERRU.

It is assumed that, in FIG. 6C, the non-service ERRU B learns that one copy of original uplink COMP frequency domain data needs to be uploaded according to the transmission mode, then the non-service ERRU B will separate original uplink COMP frequency domain data B from the received uplink data, and may simultaneously transmit the original uplink COMP frequency domain data B to the service ERRU A, the service ERRU C and the centralized processing node in a multicast mode, according to the multicast address allocated by the centralized processing node in the transmission mode (indicated by arrows ①,② in FIG. 6C);

the service ERRU A separates original uplink COMP frequency domain data A from the received uplink data, compresses the original uplink COMP frequency domain data A and the original uplink COMP frequency domain data B, and may transmit the compressed uplink COMP frequency domain data to the centralized processing node in a unicast mode (indicated by arrows ③,④ in FIG. 6C);

the service ERRU C separates original uplink COMP frequency domain data C from the received uplink data, compresses the original uplink COMP frequency domain data C and the original uplink COMP frequency domain data B, and may transmit the compressed uplink COMP frequency domain data to the centralized processing node in the unicast mode (indicated by arrows ⑤,⑥ in FIG. 6C);

the centralized processing node implements decompression according to original uplink COMP frequency domain data A and two copies of compressed uplink COMP frequency domain data to obtain three copies of original frequency domain data, namely, original uplink COMP frequency domain data A, original uplink COMP frequency domain data B and original uplink COMP frequency domain data C.

In the above-mentioned FIG. 6C, a plurality of service ERRUs are set to reduce the uplink transmission flow of access layer, convergence layer and core layer transmission networks where a single service ERRU is located, and meanwhile, the calculated load of data compression is shared by a plurality of service ERRUs, to reduce the calculated load of a single service ERRU.

Figure 6D:
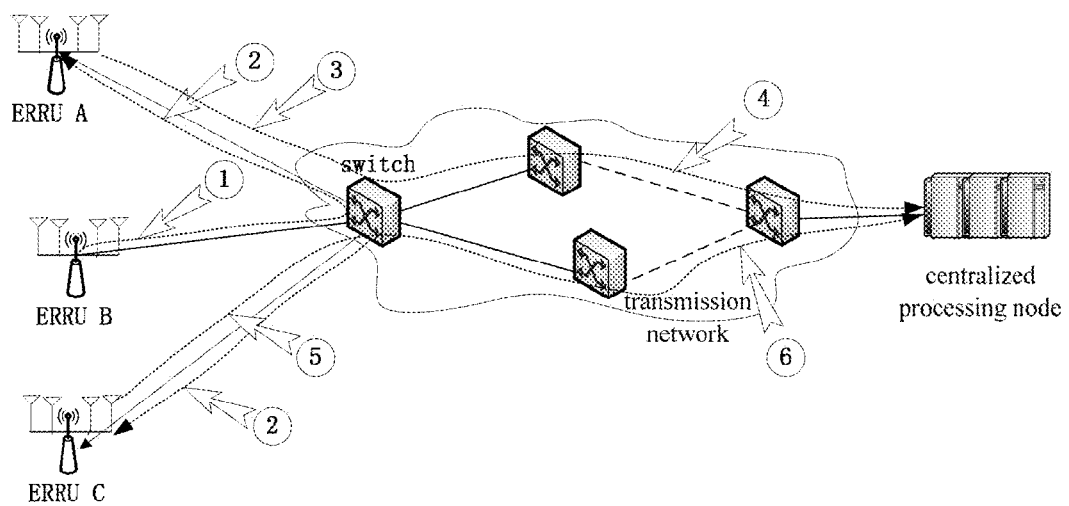
FIG. 6D is a schematic diagram of a fourth uplink data transmission process utilizing an embodiment of the present invention under a COMP network structure.

FIG. 6D is a schematic diagram of a fourth uplink data transmission process utilizing an embodiment of the present invention under a COMP network structure, in the uplink data transmission process, still two service ERRUs are set, one service ERRU transmits the compressed uplink COMP frequency domain data and at least one copy of original uplink COMP frequency domain data, and the other service ERRU only transmits the compressed uplink COMP frequency domain data:

in FIG. 6D, the COMP set includes ERRU A, ERRU B and ERRU C, the above-mentioned ERRUs interact information through a transmission network and the centralized processing node. In this case, it is assumed that the ERRU A and the ERRU C are service ERRUs, and the ERRU B is a non-service ERRU.

The centralized processing node sends control information to all ERRUs in the COMP set, wherein the control information includes the address information of the set service ERRU and the uplink transmission modes of the ERRUs, it is assumed that the specific information of the uplink transmission mode in FIG. 6D includes: one service ERRU needs to upload the original uplink COMP frequency domain data and the compressed uplink COMP frequency domain data, the rest service ERRU needs to upload the compressed uplink COMP frequency domain data, and the non-service ERRU needs to transmit the original uplink COMP frequency domain data to the two service ERRUs.

It is assumed that, in FIG. 6D, after separating original uplink COMP frequency domain data B from the received uplink data, the non-service ERRU B may simultaneously transmit the original uplink COMP frequency domain data B to the service ERRU A and the service ERRU C in a multicast mode, according to the multicast address allocated by the centralized processing node in the transmission mode (indicated by arrows ①,② in FIG. 6D);

it is assumed that the service ERRU A learns that one copy of original uplink COMP frequency domain data needs to be uploaded according to the transmission mode, after separating original uplink COMP frequency domain data A from the received uplink data, the service ERRU A compresses the original uplink COMP frequency domain data A and the original uplink COMP frequency domain data B to obtain compressed uplink COMP frequency domain data, and may transmit the compressed uplink COMP frequency domain data and the original uplink COMP frequency domain data A or the original uplink COMP frequency domain data B to the centralized processing node in the unicast mode (indicated by arrows ③,④ in FIG. 6D);

the service ERRU C separates original uplink frequency domain data C from the received uplink data, compresses the original uplink frequency domain data C and the original uplink frequency domain data B, and may transmit the compressed uplink COMP frequency domain data to the centralized processing node in the unicast mode (indicated by arrows ⑤,⑥ in FIG. 6D);

the centralized processing node implements decompression according to original uplink COMP frequency domain data A and two copies of compressed uplink COMP frequency domain data to obtain three copies of original frequency domain data, namely, original uplink COMP frequency domain data A, original uplink COMP frequency domain data B and original uplink COMP frequency domain data C.

In the above-mentioned FIG. 6D, a plurality of service ERRUs are set to reduce the uplink transmission flow of access layer, convergence layer and core layer transmission networks where a single service ERRU is located; meanwhile, the calculated load of data compression is shared by a plurality of service ERRUs, to reduce the calculated load of a single service ERRU; moreover, the non-service ERRU A and the non-service ERRU C only need to transmit the original uplink COMP frequency domain data to the service ERRU B without uploading the same to the centralized processing node, so that the uplink transmission flow of convergence layer and core layer transmission networks where the non-service ERRUs are located, may be reduced.

Corresponding to the embodiment of the uplink data transmission method of the present invention, the present invention further provides embodiments of an uplink data transmission apparatus and system.

Figure 7:
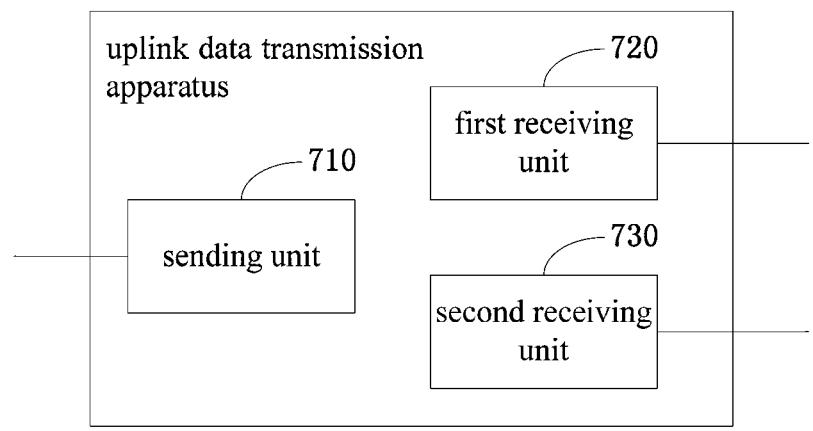
FIG. 7 is a block diagram of a first embodiment of an uplink data transmission apparatus of the prevent invention.

FIG. 7 is a block diagram of a first embodiment of an uplink data transmission apparatus of the prevent invention, the apparatus may be arranged in a centralized processing node:

the apparatus includes: a sending unit 710, a first receiving unit 720 and a second receiving unit 730.

In this case, the sending unit 710 is configured to, send control information to ERRUs in a COMP set, wherein the control information includes address information of a service ERRU in the COMP set and the transmission mode of ERRUs in the COMP set, and the other ERRUs excluding the service ERRU in the COMP set are non-service ERRUs;

the first receiving unit 720 is configured to, receive compressed uplink COMP frequency domain data sent by the service ERRU in the COMP set according to the transmission mode, wherein the compressed uplink COMP frequency domain data are data obtained by the service ERRU by compressing original uplink COMP frequency domain data sent by the non-service ERRU in the COMP set and the original uplink COMP frequency domain data of the service ERRU; and the second receiving unit 730 is configured to, receive the original uplink COMP frequency domain data sent by at least one ERRU in the COMP set according to the transmission mode.

Specifically, the transmission mode of the ERRUs in the COMP set sent by the sending unit 710 may include:

at least one ERRU in the COMP set transmits the original uplink COMP frequency domain data to the centralized processing node; the non-service ERRU in the COMP set transmits the original uplink COMP frequency domain data to the service ERRU; the service ERRU in the COMP set transmits the compressed uplink COMP frequency domain data to the centralized processing node;

in this case, according to any one of the following manners, at least one ERRU transmits the original uplink COMP frequency domain data to the centralized processing node: at least one non-service ERRU transmits the original uplink COMP frequency domain data to the centralized processing node; or at least one service ERRU transmits the original uplink COMP frequency domain data to the centralized processing node; or at least one non-service ERRU and at least one service ERRU transmit the original uplink COMP frequency domain data to the centralized processing node.

Figure 8:
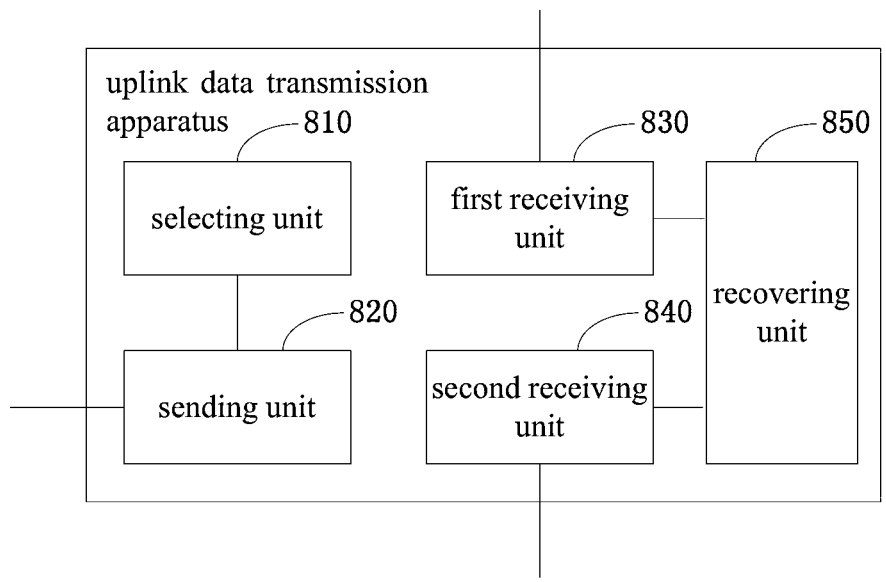
FIG. 8 is a block diagram of a second embodiment of an uplink data transmission apparatus of the prevent invention.

FIG. 8 is a block diagram of a second embodiment of an uplink data transmission apparatus of the prevent invention, the apparatus may be arranged in a centralized processing node:

the apparatus includes: a selecting unit 810, a sending unit 820, a first receiving unit 830, a second receiving unit 840 and a recovering unit 850.

In this case, the selecting unit 810 is configured to select at least one service ERRU according to network information or state information of ERRUs in a COMP set; the sending unit 820 is configured to send control information to ERRUs in the COMP set, wherein the control information includes address information of the service ERRU in the COMP set and the transmission mode of ERRUs in the COMP set, and the other ERRUs excluding the service ERRU in the COMP set are non-service ERRUs;

the first receiving unit 830 is configured to, receive compressed uplink COMP frequency domain data sent by the service ERRU in the COMP set according to the transmission mode, wherein the compressed uplink COMP frequency domain data are data obtained by the service ERRU by compressing original uplink COMP frequency domain data sent by the non-service ERRU in the COMP set and the original uplink COMP frequency domain data of the service ERRU;

the second receiving unit 840 is configured to, receive the original uplink COMP frequency domain data sent by at least one ERRU in the COMP set according to the transmission mode; and the recovering unit 850 is configured to, recover the original uplink COMP frequency domain data of each ERRU in the COMP set according to the compressed uplink COMP frequency domain data and the original uplink COMP frequency domain data.

Specifically, the transmission mode of the ERRUs in the COMP set sent by the sending unit 820 may include:

at least one ERRU in the COMP set transmits the original uplink COMP frequency domain data to the centralized processing node; the non-service ERRUs in the COMP set transmits the original uplink COMP frequency domain data to the service ERRU; the service ERRU in the COMP set transmits the compressed uplink COMP frequency domain data to the centralized processing node;

in this case, according to any one of the following manners, at least one ERRU transmits the original uplink COMP frequency domain data to the centralized processing node: at least one non-service ERRU transmits the original uplink COMP frequency domain data to the centralized processing node; or at least one service ERRU transmits the original uplink COMP frequency domain data to the centralized processing node; or at least one non-service ERRU and at least one service ERRU transmit the original uplink COMP frequency domain data to the centralized processing node.

Figure 9:
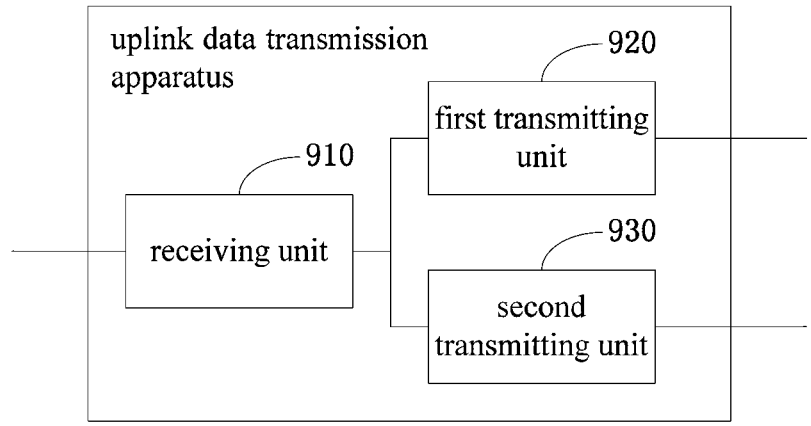
FIG. 9 is a block diagram of a third embodiment of an uplink data transmission apparatus of the prevent invention.

FIG. 9 is a block diagram of a third embodiment of an uplink data transmission apparatus of the prevent invention, the apparatus may be arranged in an ERRU:

the apparatus includes: a receiving unit 910, a first transmitting unit 920 and a second transmitting unit 930.

In this case, the receiving unit 910 is configured to, receive control information sent by a centralized processing node, wherein the ERRU is an ERRU in a COMP set, the control information includes address information of the service ERRU in the COMP set and the transmission mode of ERRUs in the COMP set, and the other ERRUs excluding the service ERRU in the COMP set are non-service ERRUs;

the first transmitting unit 920 is configured to, when the ERRU is the service ERRU, compress the original uplink COMP frequency domain data sent by non-service ERRUs in the COMP set and the original uplink COMP frequency domain data of the service ERRU to generate compressed uplink COMP frequency domain data, and transmit the compressed uplink COMP frequency domain data to the centralized processing node according to the transmission mode; and the second transmitting unit 930 is configured to, when the ERRU is the non-service ERRU, transmit the original uplink COMP frequency domain data of the non-service ERRU to the service ERRU according to the transmission mode, in accordance with the address information of the service ERRU.

Figure 10:
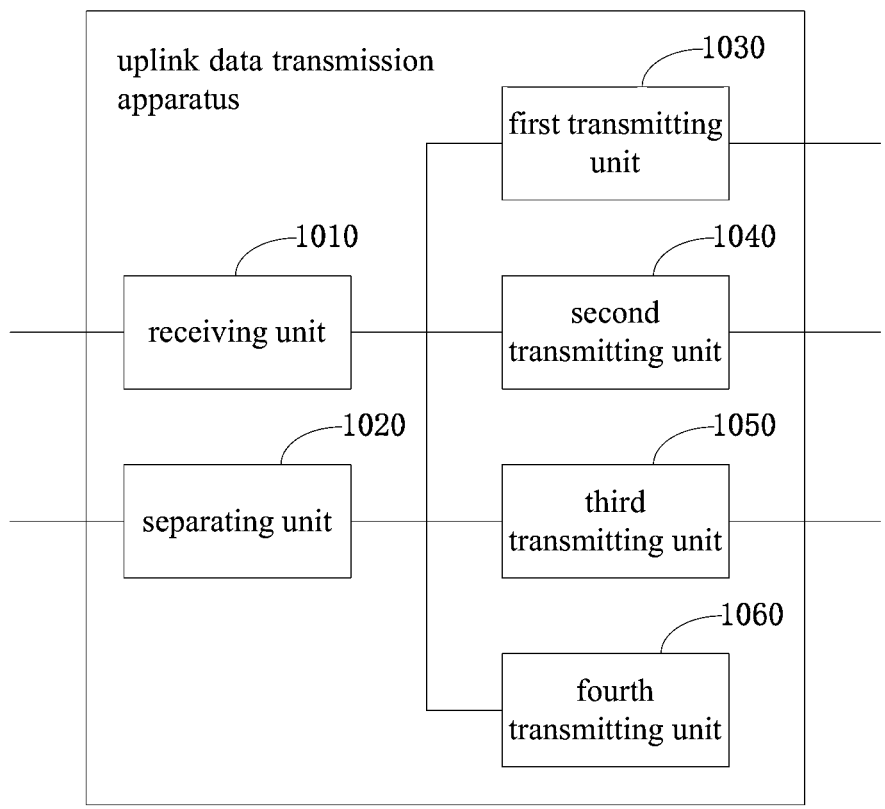
FIG. 10 is a block diagram of a fourth embodiment of an uplink data transmission apparatus of the prevent invention.

FIG. 10 is a block diagram of a fourth embodiment of an uplink data transmission apparatus of the prevent invention, the apparatus may be arranged in an ERRU:

the apparatus includes: a receiving unit 1010, a separating unit 1020, a first transmitting unit 1030, a second transmitting unit 1040, a third transmitting unit 1050 and a fourth transmitting unit 1060.

The receiving unit 1010 is configured to, receive control information sent by a centralized processing node, wherein the ERRU is an ERRU in a COMP set, the control information includes address information of the service ERRU in the COMP set and the transmission mode of ERRUs in the COMP set, and the other ERRUs excluding the service ERRU in the COMP set are non-service ERRUs;

the separating unit 1020 is configured to, after receiving the uplink data, separate the original uplink COMP frequency domain data from the uplink data;

the first transmitting unit 1030 is configured to, when the ERRU is the service ERRU, compress the original uplink COMP frequency domain data sent by non-service ERRUs in the COMP set and the original uplink COMP frequency domain data of the service ERRU to generate compressed uplink COMP frequency domain data, and transmit the compressed uplink COMP frequency domain data to the centralized processing node according to the transmission mode;

the second transmitting unit 1040 is configured to, when the ERRU is the non-service ERRU, transmit the original uplink COMP frequency domain data of the non-service ERRU to the service ERRU according to the transmission mode, in accordance with the address information of the service ERRU;

the third transmitting unit 1050 is configured to, when the ERRU is the non-service ERRU, transmit the original uplink COMP frequency domain data of the non-service ERRU to the centralized processing node according to the transmission mode; and the fourth transmitting unit 1060 is configured to, when the ERRU is the service ERRU, transmit at least one original uplink COMP frequency domain data, in the original uplink COMP frequency domain data transmitted by at least one non-service ERRU in the COMP set to the service ERRU and the original uplink COMP frequency domain data of the service ERRU, to the centralized processing node according to the transmission mode.

Figure 11:
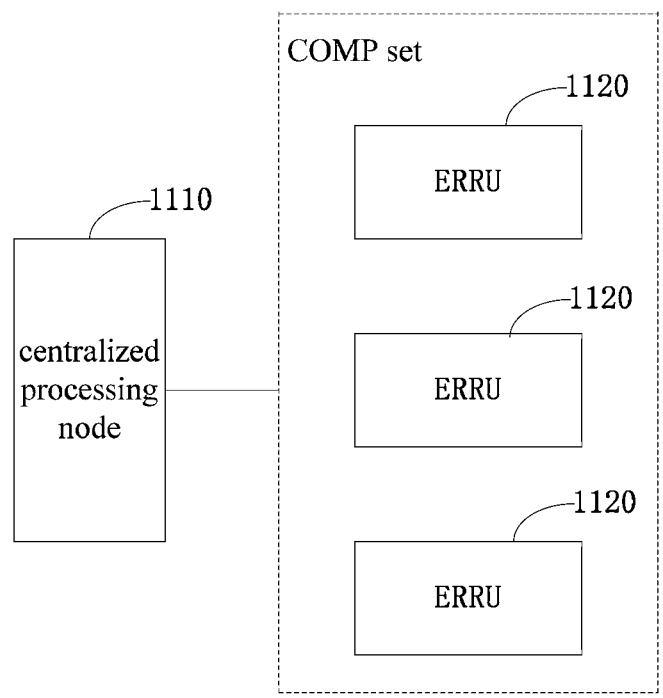
FIG. 11 is a block diagram of an embodiment of an uplink data transmission system of the prevent invention.

FIG. 11 is a block diagram of an embodiment of an uplink data transmission system of the prevent invention:

the system includes: a centralized processing node 1110 and ERRUs 1120 belonging to one COMP set, for convenient example, the COMP set as shown in FIG. 11 contains three ERRUs 1120.

In this case, the centralized processing node 1110 is configured to, send control information to ERRUs in the COMP set, wherein the control information includes address information of a service ERRU in the COMP set and the transmission mode of ERRUs in the COMP set, and the other ERRUs excluding the service ERRU in the COMP set are non-service ERRUs;

the ERRU 1120 is configured to, when the ERRU is a service ERRU, compress the original uplink COMP frequency domain data sent by the non-service ERRU in the COMP set and the original uplink COMP frequency domain data of the service ERRU to generate compressed uplink COMP frequency domain data, and transmit the compressed uplink COMP frequency domain data to the centralized processing node 1110 according to the transmission mode; when the ERRU is a non-service ERRU, transmit the original uplink COMP frequency domain data of the non-service ERRU to the service ERRU in the COMP set according to the transmission mode, in accordance with the address information of the service ERRU;

the centralized processing node 1110 is further configured to, receive the original uplink COMP frequency domain data sent by at least one ERRU in the COMP set according to the transmission mode.

It may be seen from the above-mentioned embodiment that, the centralized processing node sends the control information containing the address information of the service ERRU and the transmission mode to the ERRU in the COMP set, when the ERRU is the service ERRU, the original uplink COMP frequency domain data sent by the non-service ERRU in the COMP set and the original uplink COMP frequency domain data of the service ERRU are compressed to generate compressed uplink COMP frequency domain data, and the compressed uplink COMP frequency domain data are transmitted to the centralized processing node according to the transmission mode, when the ERRU is the non-service ERRU, the original uplink COMP frequency domain data of the non-service ERRU are transmitted to the service ERRU in the COMP set according to the transmission mode in accordance with the address information of the service ERRU, the centralized processing node receives the original uplink COMP frequency domain data sent by at least one ERRU in the COMP set according to the transmission mode, and the number of at least one ERRU is smaller than the sum of all ERRUs in the COMP set. In the embodiments of the present invention, the service ERRU in the COMP set is determined, for enabling the non-service ERRUs to transmit the original uplink COMP frequency domain data to the service ERRU for uniform compression and send the compressed original uplink COMP frequency domain data to the centralized processing node, meanwhile, at least one ERRU in the COMP set may transmit the original COMP frequency domain data to the centralized processing node, for enabling the centralized processing node to recover the original uplink COMP frequency domain data of all ERRUs in the COMP set according to the compressed uplink COMP frequency domain data and the original COMP frequency domain data; therefore, by adopting the embodiment of the present invention, when a plurality of ERRUs in the COMP set jointly receive data, the data may be compressed to obtain a compression gain, in order to reduce the uplink transmission flow between the ERRUs in the COMP set and the centralized processing node.

Those skilled in the art may clearly understand that the technology in the embodiments of the present invention may be implemented by software plus a necessary universal hardware platform. Based on such understanding, the technical solutions in the embodiments of the present invention essentially or the part contributing to the prior art may be embodied in the form of a software product, the computer software product may be stored in a storage medium, such as an ROM/RAM, a magnetic disk, an optical disk or the like, and include several instructions for instructing a computer device (may be a personal computer, a server, or network equipment or the like) to perform the embodiments of the present invention, or the above-mentioned methods in certain portions of the embodiments.

The embodiments in the specification are described in a progressive manner, the identical or similar parts between the embodiments may refer to each other, and what is highlighted in each embodiment is difference with other embodiments. In particular, for the system embodiment, it is basically similar to the method embodiments, thus is described simply, and related parts may see a part of illustration to the method embodiments.

The embodiments of the present invention described above are not construed as limiting the scope of the present invention. Any modifications, equivalent substitutions and improvements or the like made within the spirit and principle of the present invention shall fall within the protection scope of the present invention.

What is claimed is:

1. A method for uplink data transmission, comprising:
sending, by a centralized processing node, control information to evolved remote radio units ERRUs in a coordinated multipoint transmission and reception COMP set, wherein the control information comprises the address information of a service ERRU in the COMP set and the transmission mode of ERRUs in the COMP set, and the other ERRUs excluding the service ERRU in the COMP set are non-service ERRUs; and
receiving compressed uplink COMP frequency domain data sent by the service ERRU in the COMP set according to the transmission mode, wherein the compressed uplink COMP frequency domain data are data obtained by the service ERRU by compressing original uplink COMP frequency domain data sent by a non-service ERRU in the COMP set and the original uplink COMP frequency domain data of the service ERRU, and receiving the original uplink COMP frequency domain data sent by at least one ERRU in the COMP set according to the transmission mode.

2. The method of claim 1, wherein the transmission mode of the ERRUs in the COMP set comprises:
transmitting, by at least one ERRU in the COMP set, the original uplink COMP frequency domain data to the centralized processing node;
transmitting, by a non-service ERRU in the COMP set, the original uplink COMP frequency domain data to the service ERRU; and
transmitting, by the service ERRU in the COMP set, the compressed uplink COMP frequency domain data to the centralized processing node.

3. The method of claim 2, wherein the transmitting, by at least one ERRU, the original uplink COMP frequency domain data to the centralized processing node, according to any of the following manners:
transmitting, by at least one non-service ERRU, the original uplink COMP frequency domain data to the centralized processing node; or
transmitting, by at least one service ERRU, the original uplink COMP frequency domain data to the centralized processing node; or
transmitting, by at least one non-service ERRU and at least one service ERRU, the original uplink COMP frequency domain data to the centralized processing node.

4. The method of claim 1, further comprising:
selecting, by the centralized processing node, at least one service ERRU according to one of network information and state information of the ERRUs in the COMP set.

5. The method of claim 1, further comprising:
recovering, by the centralized processing node, the original uplink COMP frequency domain data of each ERRU in the COMP set according to the compressed uplink COMP frequency domain data and the original uplink COMP frequency domain data.

6. A method for uplink data transmission, comprising:
receiving, by an ERRU, control information sent by a centralized processing node, wherein the ERRU is an ERRU in a COMP set, the control information comprises address information of a service ERRU in the COMP set and the transmission mode of ERRUs in the COMP set, and the other ERRUs excluding the service ERRU in the COMP set are non-service ERRUs; and
when the ERRU is a service ERRU, compressing original uplink COMP frequency domain data sent by a non-service ERRU in the COMP set and the original uplink COMP frequency domain data of the service ERRU to generate compressed uplink COMP frequency domain data, and transmitting the compressed uplink COMP frequency domain data to the centralized processing node according to the transmission mode; when the ERRU is a non-service ERRU, transmitting the original uplink COMP frequency domain data of the non-service ERRU to the service ERRU according to the transmission mode in accordance with the address information of the service ERRU.

7. The method of claim 6, further comprising:
when the ERRU is the non-service ERRU, transmitting the original uplink COMP frequency domain data of the non-service ERRU to the centralized processing node according to the transmission mode; and
when the ERRU is the service ERRU, transmitting at least one of the original uplink COMP frequency domain data, in the original uplink COMP frequency domain data transmitted to the service ERRU by at least one non-service ERRU in the COMP set and the original uplink COMP frequency domain data of the service ERRU, to the centralized processing node according to the transmission mode.

8. The method of claim 6, further comprising:
after receiving uplink data, separating, by the ERRU, the original uplink COMP frequency domain data from the uplink data.

9. An apparatus for uplink data transmission, wherein the apparatus is arranged in a centralized processing node, and the apparatus comprises:
a transmitter, configured to send control information to ERRUs in a COMP set, wherein the control information comprises address information of a service ERRU in the COMP set and the transmission mode of ERRUs in the COMP set, and the other ERRUs excluding the service ERRU in the COMP set are non-service ERRUs; and
a receiver, configured to:
receive compressed uplink COMP frequency domain data sent by the service ERRU in the COMP set according to the transmission mode, wherein the compressed uplink COMP frequency domain data are data obtained by the service ERRU by compressing original uplink COMP frequency domain data sent by the non-service ERRUs in the COMP set and the original uplink COMP frequency domain data of the service ERRU; and receive the original uplink COMP frequency domain data sent by at least one ERRU in the COMP set according to the transmission mode.

10. The apparatus of claim 9, wherein the transmission mode of the ERRUs in the COMP set sent by the transmitter comprises:

transmitting, by at least one ERRU in the COMP set, the original uplink COMP frequency domain data to the centralized processing node;

transmitting, by a non-service ERRU in the COMP set, the original uplink COMP frequency domain data to the service ERRU; and transmitting, by the service ERRU in the COMP set, the compressed uplink COMP frequency domain data to the centralized processing node;

wherein, the at least one ERRU transmits the original uplink COMP frequency domain data to the centralized processing node according to any of the following manners:

transmitting, by at least one non-service ERRU, the original uplink COMP frequency domain data to the centralized processing node; or transmitting, by at least one service ERRU, the original uplink COMP frequency domain data to the centralized processing node; or transmitting, by at least one non-service ERRU and at least one service ERRU, the original uplink COMP frequency domain data to the centralized processing node.

11. The apparatus of claim 9, further comprising:
a selector, configured to select at least one service ERRU according to one of network information and state information of the ERRUs in the COMP set.

12. The apparatus of claim 9, further comprising:
a processor, configured to recover the original uplink COMP frequency domain data of each ERRU in the COMP set according to the compressed uplink COMP frequency domain data and the original uplink COMP frequency domain data.

13. An apparatus for uplink data transmission, wherein the apparatus is arranged in an ERRU, and the apparatus comprises:

a receiver, configured to receive control information sent by a centralized processing node, wherein the ERRU is an ERRU in a COMP set, the control information comprises address information of a service ERRU in the COMP set and the transmission mode of ERRUs in the COMP set, and the other ERRUs excluding the service ERRU in the COMP set are non-service ERRUs; and a transmitter, configured to, when the ERRU is a service ERRU, compress original uplink COMP frequency domain data sent by a non-service ERRU in the COMP set and the original uplink COMP frequency domain data of the service ERRU to generate compressed uplink COMP frequency domain data, and transmit the compressed uplink COMP frequency domain data to the centralized processing node according to the transmission mode; and wherein the transmitter is further configured to, when the ERRU is a non-service ERRU, transmit the original uplink COMP frequency domain data of the non-service ERRU to the service ERRU according to the transmission mode in accordance with the address information of the service ERRU.

14. The apparatus of claim 13, wherein the transmitter is further configured to:

when the ERRU is a non-service ERRU, transmit the original uplink COMP frequency domain data of the non-service ERRU to the centralized processing node according to the transmission mode; and when the ERRU is a service ERRU, transmit at least one of original uplink COMP frequency domain data, in the original uplink COMP frequency domain data transmitted by at least one non-service ERRU in the COMP set to the service ERRU and the original uplink COMP frequency domain data of the service ERRU, to the centralized processing node according to the transmission mode.

15. The apparatus of claim 13, further comprising:
a processor, configured to, after receiving uplink data, separate the original uplink COMP frequency domain data from the uplink data.

\* \* \* \* \*